United States Patent
Yoshida et al.

(10) Patent No.: US 6,660,430 B1
(45) Date of Patent: Dec. 9, 2003

(54) PACKAGE FOR NONAQUEOUS ELECTROLYTE CELL AND CELL COMPRISING THE SAME

(75) Inventors: Yasuhiro Yoshida, Tokyo (JP); Osamu Hiroi, Tokyo (JP); Yukiyasu Nakao, Tokyo (JP); Hisashi Shiota, Tokyo (JP); Shigeru Aihara, Tokyo (JP); Daigo Takemura, Tokyo (JP); Hiroaki Urushibata, Tokyo (JP); Michio Murai, Tokyo (JP); Tetsuyuki Kurata, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/926,156
(22) PCT Filed: Jan. 24, 2000
(86) PCT No.: PCT/JP00/00310
   § 371 (c)(1),
   (2), (4) Date: Sep. 14, 2001
(87) PCT Pub. No.: WO01/56097
   PCT Pub. Date: Feb. 8, 2001
(51) Int. Cl.$^7$ .................................. H01M 2/08
(52) U.S. Cl. .................. 429/185; 429/127; 429/163; 383/59
(58) Field of Search .................. 429/127, 163, 429/185; 383/59, 60

(56) References Cited

U.S. PATENT DOCUMENTS

| | | | |
|---|---|---|---|
| 5,981,107 A | 11/1999 | Hamano et al. | |
| 6,024,773 A | 2/2000 | Inuzuka et al. | |
| 6,051,342 A | 4/2000 | Hamano et al. | |
| 6,124,061 A | 9/2000 | Hamano et al. | |
| 6,136,471 A | 10/2000 | Yoshida et al. | |
| 6,231,626 B1 | 5/2001 | Yoshida et al. | |
| 6,232,014 B1 | 5/2001 | Shiota et al. | |
| 6,235,066 B1 | 5/2001 | Inuzuka et al. | |
| 6,291,102 B1 | 9/2001 | Yoshida et al. | |
| 6,306,540 B1 | 10/2001 | Hiro et al. | |
| 6,322,599 B1 | 11/2001 | Hamano et al. | |
| 6,379,838 B1 * | 4/2002 | Olsen et al. | 429/163 |

FOREIGN PATENT DOCUMENTS

| | | |
|---|---|---|
| JP | 3-80964 | 8/1991 |
| JP | 6-302305 | 10/1994 |
| JP | 8-287889 | 11/1996 |
| JP | 9-265967 | 10/1997 |
| JP | 11-195405 | 7/1999 |
| JP | 11-312505 | 11/1999 |

* cited by examiner

Primary Examiner—Patrick Ryan
Assistant Examiner—Tracy Dove
(74) Attorney, Agent, or Firm—Oblon, Spivak, McClelland, Maier & Neustadt, P.C.

(57) ABSTRACT

There is provided a package for a non-aqueous electrolytic battery by which water invasion from outside is lowered and adhesion strength is improved over the long term, and a non-aqueous electrolytic battery having a lengthened life and high reliability.

In a package for a non-aqueous electrolytic battery having a bag construction to store a battery content made by adhesion of a part of a lamination film comprising a metal layer and a resin layer, the adhesion part holds a structure capable of reacting with or absorbing an element which diffuses from the battery interior inwardly to the battery interior side.

6 Claims, 1 Drawing Sheet

- 8 Package for a non-aqueous electrolytic battery
- 1 Aluminum layer
- Adhesion part 4
- 3 Adhesive layer
- 2 Polypropylene layer
- 3 Adhesive layer
- 1 Aluminum layer
- 5 Aluminum fiber

- 7 Tab
- 6 Rolled out electrode
- 8 Package for a non-aqueous electrolytic battery
- 5 Aluminum fiber
- 4 Adhesion part

PACKAGE FOR NONAQUEOUS ELECTROLYTE CELL AND CELL COMPRISING THE SAME

TECHNICAL FIELD

The present invention relates to a package for non-aqueous electrolytic battery. More particularly, the present invention relates to a package for non-aqueous electrolytic battery which can prevent water from invading externally and strength from decreasing over the long term and lengthen life and heighten reliability of the battery, and relates to a non-aqueous electrolytic battery whose life is lengthened and reliability is heightened by using said package.

BACKGROUND ART

Downsizing and weight saving of batteries are needed for smaller and lighter portable electronic devices. Lithium ion batteries are regarded as the most suitable secondary battery for achieving the object because of the high voltage and high energy density, and are being actively upgraded. One of the important points for the upgrade of the battery is to replace recent metal outer housing of the battery with a lighter package comprising a film such as an aluminum laminated film or the like. Such a package comprising a film is prepared by thermal melting and adhesion of a part of a folded film covering a battery content, and is formed like a bag.

Compared to the currently used metal outer housings, these packages comprising films have inferior blocking against water invading into a battery and insufficient strength because of its adhesion part, which possibly causes troubles with long-term battery performance or reliability in high temperature.

The present invention has been carried out in order to solve the above problems. The object of the present invention is to provide a battery package for a non-aqueous electrolytic battery such as lithium ion batteries, using a laminated film, by which water blocking is ensured and strength is maintained easily for a long time, and to provide a battery using the same.

As a means for improving the reliability of these packages, there are, for example, a process for maintaining credible sealing by laminating a protective film at a heat-sealed part as shown in Japanese Unexamined Patent Publication No. 40114/1999 and a process for maintaining credible sealing by constructing a heat-sealed part with a plurality of resins, i.e., a material having superior barrier performance against electrolyte and a material having excellent vapor barrier performance as shown in Japanese Unexamined Patent Publication No. 274896/1997. However, these processes have problems with increase of package weight and complicated steps.

DISCLOSURE OF INVENTION

The present inventors have found some important facts about water blocking and durability of adhesion strength concerning a package for a non-aqueous electrolytic battery using a laminated film. It was found that a trace of reactive substance diffused into the adhesion layer from the package interior side, leading to decrease of water blocking and adhesion strength of the package. The reactive substance in a trace quantity seems to comprise substance separated from electrolytic salt such as acid including hydrogen fluoride, or $PF_5$. Diffusion of the substance causes deterioration of the adhesion layer or an aluminum layer, resulting in decrease of water blocking performance and adhesion strength. The laminated film can hold a structure capable of reacting with or absorbing a diffusing element to inhibit the diffusion from the battery interior. However this process causes unfavorable phenomena such as decrease in adhesion strength and increase in water diffusion from outside. Prevention of the diffusion from the battery interior without affecting performance of the adhesion part is highly effective in improving package performances.

More specifically, the present invention relates to: a package for non-aqueous electrolytic battery, having a bag construction to store a battery content made by adhesion of a part of a lamination film comprising a metal layer and a resin layer, wherein the adhesion part holds a structure capable of reacting with or absorbing an element which diffuses from battery interior inwardly to the battery interior side; the package for a non-aqueous electrolytic battery, wherein adhesion of the film is performed by using a hot-melt adhesive in the form of tape containing a structure capable of reacting with or absorbing A an element which diffuses from battery interior; the package for a non-aqueous electrolytic battery, wherein adhesion of the film is performed by a hot-melt adhesive in the form of tape containing, in parallel to the longitudinal direction, a filament structure capable of reacting with or absorbing an element which diffuses from battery interior; a battery using the package for a non-aqueous electrolytic battery.

BRIEF DESCRIPTION OF DRAWINGS

In FIG. 1, numeral 1 indicates an aluminum layer, 2 a polypropylene layer, 3 an adhesive layer, 4 adhesion part and 5 a structure capable of reacting with and absorbing an element which diffuses from the battery interior.

In FIG. 2, numeral 4 indicates the adhesion part, 5 an aluminum fiber, 6 a rolled out electrode, 7 a terminal for current collection (a tab) and 8 a package for non-aqueous electrolytic battery.

BEST MODE FOR CARRYING OUT THE INVENTION

Figure 1:
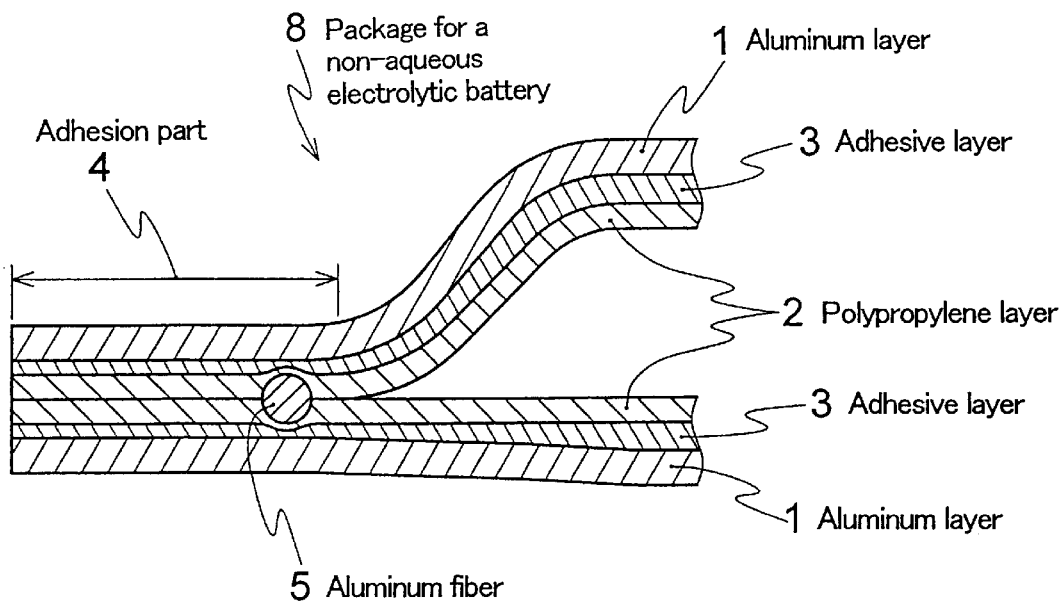
FIG. 1 is a cross-sectional view schematically showing the adhesion part of the package for a non-aqueous electrolytic battery according to one embodiment of the present invention.

The present invention relates to a package for non-aqueous electrolytic battery, having a bag construction storing a battery content made by adhesion of a part of a lamination film comprising a metal layer and a resin layer, wherein the adhesion part holds a structure capable of reacting with or absorbing an element which diffuses from the battery interior.

The film used for the package is formed by laminating at least a metal layer and a resin layer which coats the package interior side of the metal layer.

Metal foil such as aluminum foil, stainless foil or titanium foil can be used for the metal layer. The thickness of the metal layer is preferably 3 to 200 $\mu$m, more preferably 10 to 100 $\mu$m. Too thin a metal film tends to cause easy generation of defects such as pinholes, leading to inferior reliability. Too thick a metal layer tends to cause increase of weight.

The surface of the metal foil may be treated so that an oxide film or a nitride film is formed thereon in order to improve endurance.

As to the resin layer, any resin layer may be available as long as it does not dissolve into an electrolytic solution and prevents the metal layer from corroding. A polyolefin film such as polypropylene, polyethylene or a copolymer thereof is preferably used as the resin layer. Other useful films include a film comprising a fluorine resin, a vinyl polymer such as polystyrene, a cross-linked acrylic resin and the like. The thickness of the resin layer is preferably 5 to 200 $\mu$m, more preferably 20 to 100 $\mu$m. When the resin layer is thin, steady heat-sealing tends to become difficult. When the resin layer is thick, the strength at the heat-sealing part tends to decrease.

An adhesive can be used for the adhesion of the metal layer and the resin layer, if necessary. Coating or film lamination onto the package exterior side of the metal layer is also preferable for improving strength and preventing corrosion.

The package of the present invention has a bag construction made by adhesion of a part of a lamination film comprising a metal layer and a resin layer. An adhesive can be used for the adhesion of the film. A hot-melt adhesive is preferable as the adhesive for the adhesion of the film in terms of workability, moisture permeability or the like. When polyolefin is used for the resin layer of the film, this can be used as the hot-melt adhesive for the adhesion of the film. An epoxy adhesive or a urethane adhesive can be also used as long as it is resistant to electrolytes. These adhesives can be used in combination of two or more. The resin layer at the adhesion part of the film may be removed if required. In this case attention should be paid not to expose the metal layer to the package interior, and not to generate defects such as crack on the metal layer. Also useful is a hot-melt adhesive in the form of tape.

The elements which diffuses from the battery interior are substance separated from electrolytic salt such as acid including hydrogen fluoride, or $PF_5$ depending on kinds of battery (electrode or electrolyte).

Useful as the structure capable of reacting with or absorbing the element which diffuses from the battery interior are metal such as aluminum or iron, an inorganic material such as carboxylate or metal oxide, salt of polymer containing carboxylic acid such as methacrylic acid, acrylic acid or maleic acid, polymers containing a basic group such as an amino group, and the like. Preferably, these substances may also be surface-treated to fit with the material constituting the adhesion layer if necessary.

The useful shape for the structure capable of reacting with or absorbing the element which diffuses from the battery interior is powdery, flaky or filament form while a material of a variety of sizes can be used considering the width and the length of the adhesion part and the like.

As to the structure made of powder, for example, particle size thereof is preferably about 0.1 to 100 $\mu$m, more preferably about 1 to 20 $\mu$m. When the particle size is small there is a tendency that the particles cannot be added to the adhesive effectively. When it is large there is a tendency that diffusion cannot be prevented sufficiently.

As to the structure made of flakes, for example, thickness thereof is preferably about 0.5 to 200 $\mu$m, more preferably 5 to 100 $\mu$m. When it is thin there is a tendency that diffusion cannot be prevented effectively. When it is thick heat-sealing tends to be difficult. Referring to the area, the longest diameter is preferably about five times, more preferably about ten times the thickness. In this flaky structure it is easier for each structure part to be aligned, and diffusion of the non-aqueous solvent is prevented effectively. When the longest diameter is too short the alignment of the structure tends to be difficult leading to decrease of the advantage.

As to the structure made of filaments, for example, filament diameter thereof is preferably about 0.1 to 200 $\mu$m, more preferably about 5 to 100 $\mu$m while filament length thereof is preferably at least 10 $\mu$m, more preferably at least 5 mm. When the filament diameter is small the effect on preventing diffusion tends to be low. When it is large heat-sealing tends to be difficult. When the filament is short the effect on preventing diffusion tends to be low.

Filament form is most preferable for merely preventing the element from diffusing since it functions most effectively even in a little amount. Particles and porous materials are preferable in terms of the effect on prevention of diffusion by reaction or absorption.

Preferably, the structure capable of reacting with or absorbing a diffusing element is distributed inwardly to the package interior side, that is, at least more to the inside from the centric position between the package exterior side edge and the package interior side edge of the adhesion part. When the structure capable of reacting with or absorbing a diffusing element is not distributed inwardly to the package interior side, the effect on inhibition of the diffusion of the element which diffuses from the battery interior side may be reduced at the adhesion part, and prevention of water invasion and maintenance of strength may not be achieved sufficiently.

FIG. 1 schematically shows the adhesion construction of the package for a non-aqueous electrolyte battery 8 with a structure (aluminum fiber) 5 capable of reacting with or absorbing the element which diffuses from the battery interior side inwardly to the battery interior side at the adhesion part 4, regarding the package for a non-aqueous electrolyte battery 8 having a bag construction to store a battery content made by adhesion of a part of a lamination film of the aluminum layer 1 and the polypropylene layer 2 with an adhesive 3.

When a hot-melt adhesive in the form of tape is used for adhesion of the film, workability is improved by previous inclusion of the structure capable of reacting with or absorbing the element which diffuses from the battery interior into the hot-melt adhesive tape. In this case, diffusion of the element which diffuses from the battery interior can be effectively inhibited by containing, in the longitudinal direction, the filament structure capable of reacting with or absorbing the element.

A battery construction using the package of the present invention may be a laminated construction of plane electrodes and a separator, a rolled out construction, a folded construction or a combination thereof.

Current collector terminals (tabs) for the electrode of a battery are drawn out from the adhesion part of the package. As to adhesion of this part, a conductive material should not be used for the structure capable of reacting with or absorbing the element which diffuses from the battery interior in order to maintain insulation. Alternatively, there should be another insulating layer near the tabs without the structure capable of reacting with or absorbing the element which diffuses from the battery interior.

As the non-aqueous solvent for an electrolytic solution an ether solution such as dimethoxy ethane or diethyl ether, or a carbonate or ester solution such as ethylene carbonate or propylene carbonate is used alone or in combination thereof. $LiPF_6$, $LiClO_4$, $LiBF_4$ and the like can be used as the electrolyte.

Hereinafter more concrete examples of the present invention are explained in detail but the present invention is not limited thereto.

EXAMPLE 1

Process for Preparing Film

A piece of 15-$\mu$m-thick aluminum foil was laminated with a 12-$\mu$m-thick film of polyethylene terephtharate by using a urethane adhesive (5-$\mu$m-thick). A hot-melt resin layer of 50-$\mu$m-thick polyethylene was laminated on the opposite side of the aluminum foil by using a urethane adhesive (5-$\mu$m-thick). The film was cut into a piece of 70 mm×125 mm.

Process for Preparing Battery

Figure 2:
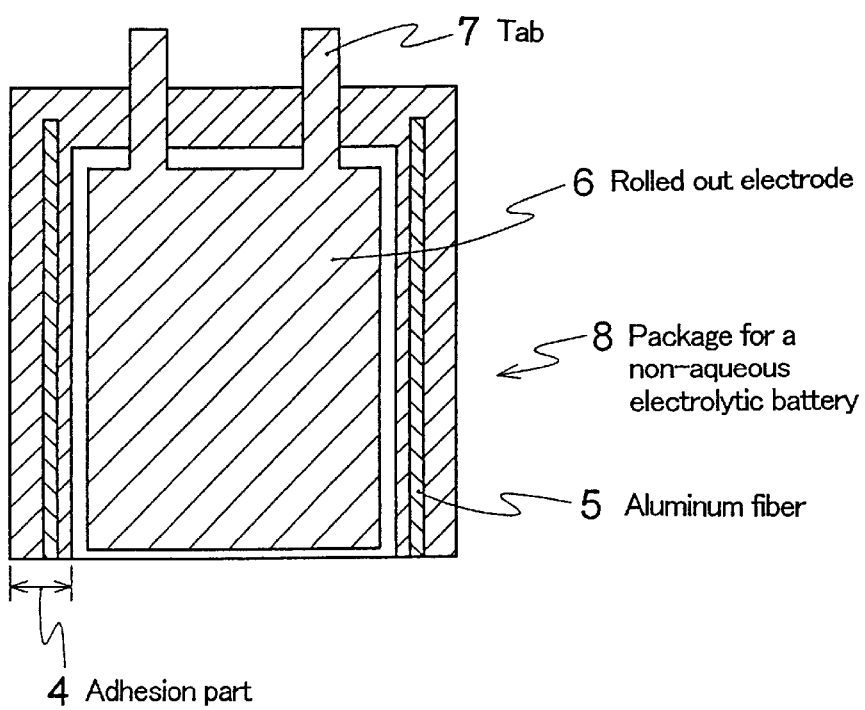
FIG. 2 is a cross-sectional view schematically showing the construction of the non-aqueous electrolytic battery prepared in Example 1.

In FIG. 2, the construction of a non-aqueous electrolytic battery prepared in Example 1 is schematically shown. Explanation is made as to a process for preparing a battery with reference to FIG. 2 in the following.

A positive electrode material was prepared by applying a paste for a positive electrode active material obtained by mixing 87% by weight of $LiCoO_2$, 8% by weight of a graphite powder (KS-6, available from LONZA Co., Ltd.) and 5% by weight of poly(vinylidene fluoride) as a binder resin onto a piece of 20-$\mu$m-thick aluminum foil according to Doctor Blade method in a thickness of about 100 $\mu$m.

A negative electrode material was prepared by applying a paste for a negative electrode active material obtained by mixing 95% by weight of mesophase microbeads carbon (available from Osaka Gas Co., Ltd.) and 5% by weight of poly(vinylidene fluoride) as a binder onto a piece of 12-$\mu$m-thick copper foil according to Doctor Blade method in a thickness of about 100 $\mu$m.

Each of the positive and negative electrode materials was cut into a size of 50 mm×200 mm and current collector terminals (tabs) were attached thereto. The separator cut into a size of 52 mm×210 mm was interposed between the positive electrode and the negative electrode. Upon rolling out the same in a width of about 5 cm, it was fixed by using a strip of polyimide tape.

Thereafter, the rolled out electrode 6 was interposed by the aluminum laminated film as shown in FIG. 2, and each side end where no tab is positioned was heat-sealed in a width of about 7 mm. In this event the aluminum fiber 5 was interposed in the adhesion layer by distributing an aluminum fiber 5 having a diameter of about 150 $\mu$m at a position about 2 mm from the battery interior in the adhesion part 4. The end of the aluminum fiber 5 at the side where the tabs 7 of the battery are drawn out was about 5 mm inward from the edge of the aluminum laminated film.

Then an electrolytic solution of $LiBF_6$ as an electrolyte in ethylene carbonate and 1,2-dimethoxyethane as a solvent was injected from a remaining edge followed by preliminary charge. Then the edge was heat-sealed by interposing a 25-$\mu$m-wide polyethylene hot-melt adhesive between the tabs 7 of the electrode and the aluminum laminated film.

Evaluation of Package Performance

The prepared battery was kept under conditions of temperature of 80° C. and humidity of 100% for four weeks.

After that the battery appearance of the battery was observed while strength at the adhesion part was measured based on peeling strength before and after the keeping.

There was no change in the battery appearance after the keeping. As to the peeled adhesion part, the peeling strength was lowered inside the aluminum fiber, but no significant change of the peeling strength was found at the other part as it showed 30 g/cm before the keeping and 25 g/cm after the keeping.

EXAMPLE 2

To an ethylene-vinyl acetate copolymer were added 50% by weight of calcium carbonate. The mixture was kneaded, melted, formed into film and was cut to prepare a structure about 300 $\mu$m thick and about 0.8 mm wide.

A battery was prepared in the same manner as in Example 1 except that the calcium carbonate structure was used instead of the aluminum fiber. In this case the calcium carbonate structure was inserted even into the side of the adhesion part from which the tabs are drawn out as well as into the both end parts. The structure was inserted between a polyethylene hot-melt adhesion film and an aluminum laminated film.

Evaluation of Package Performance

The prepared battery was kept under the same conditions as in Example 1 to evaluate performance of the package.

There was no change in the battery appearance after the keeping. As to the peeled adhesion part, the peeling strength was lowered inside the calcium carbonate structure, but no significant change of the peeling strength was found at the other part as it showed 30 g/cm before the keeping and 23 g/cm after the keeping.

COMPARATIVE EXAMPLE 1

A battery was prepared in the same manner as in Example 1 but without interposing any aluminum fiber.

Evaluation of Package Performance

The prepared battery was kept under the same conditions as in Example 1 to evaluate performance of the package.

The aluminum layer was peeled off from the hot-melt layer at some parts around the battery after the keeping.

There was significant influence of the substance diffusion from the battery interior compared to Examples 1 and 2.

EXAMPLE 3

A polypropylene hot-melt adhesive having a thickness of about 30 $\mu$m was cut into 7 mm wide. Aluminum fibers having a diameter of 50 $\mu$m were fixed thereto by light hot press at a position about 3 mm from an edge.

An aluminum laminated film and battery contents were prepared in the same manner as in Example 1 and each side end where no tab is positioned were heat-sealed by using the tapes of the hot-melt adhesive containing the aluminum fiber. Herein the aluminum fiber was distributed inwardly to the interior side of the battery. The end of the aluminum fiber at the tab side of the battery was about 5 mm inward from the edge of the aluminum laminated film. Then electrolytic solution of $LiBF_6$ as an electrolyte in ethylene carbonate and 1,2-dimethoxyethane as a solvent was injected from the remaining edge followed by preliminary charge, and then the edge was heat-sealed in a width of 10 mm by using a 25-$\mu$m-thickness polyethylene hot-melt adhesive interposed between the electrode tab part and the aluminum laminated film.

Evaluation of Package Performance

The prepared battery was kept under the same conditions as in Example 1 to evaluate performance of the package.

There was no change in the battery appearance after the keeping. As to the peeled adhesion part, the peeling strength was lowered inside the aluminum fiber, but no significant change of the peeling strength was found at the other part as it showed 35 g/cm before the keeping and 30 g/cm after the keeping.

EXAMPLE 4

A battery was prepared in the same manner as in Example 1 except for using the calcium carbonate structure prepared in the same manner as in Example 2 instead of the aluminum fiber. The calcium carbonate structure was inserted even into the portion of the adhesion part from which the tabs are drawn out as well as to the both side ends. It was interposed between the polyethylene hot-melt adhesive film and the aluminum laminated film.

Evaluation of Package Performance

The prepared battery was kept under the same conditions as in Example 1 to evaluate performance of the package.

There was no change in the battery appearance after the keeping. When the adhesion part was peeled off the peeling strength was lowered inside the calcium carbonate structure, but no significant change was found in the peeling strength at the other part as it showed 34 g/cm before the keeping and 27 g/cm after the keeping.

COMPARATIVE EXAMPLE 2

A battery was prepared in the same manner as in Example 3 but without interposing any aluminum fiber.

Evaluation of Package Performance

The prepared battery was kept under the same conditions as in Example 1 to evaluate performance of the package.

The aluminum layer was peeled off from the hot-melt layer at some parts around the battery after the keeping.

It was found that corrosion and decrease of peeling strength could be prevented by using aluminum fibers and the like when Examples 3 and 4 were compared with Comparative Example 2.

According to the invention of claim 1, it is possible to provide a package for a non-aqueous electrolytic battery by which water invasion from outside is lowered, and corrosion and decrease in adhesion strength are small at the adhesion part over the long term.

According to the invention of claim 2, it is possible to provide a package for a non-aqueous electrolytic battery by which water invasion from outside is lowered, and corrosion and decrease in adhesion strength are small at the adhesion part over the long term with high workability.

According to the invention of claim 3, it is possible to provide a package for a non-aqueous electrolytic battery by which water invasion from outside is especially lowered, and corrosion and decrease in adhesion strength are especially small at the adhesion part over the long term with high workability.

According to the invention of claims 4 to 6 it is expected to obtain a battery having a lengthened life and high reliability since water invasion from outside is lowered, and corrosion and decrease in adhesion strength are small at the adhesion part over the long term.

INDUSTRIAL APPLICABILITY

The package for a non-aqueous electrolytic battery according to the present invention can be applied to not only a lithium ion secondary battery of an organic electrolytic solution type or a gel electrolyte type, but also for a primary battery such as a lithium battery or another secondary battery.

What is claimed is:

1. A package for a non-aqueous electrolytic battery, having a bag construction to store a battery content made by adhesion of a part of a lamination film comprising a metal layer and a resin layer, wherein the adhesion part holds a structure capable of reacting with or absorbing an element which diffuses from the battery interior outwardly to the battery exterior side.

2. The package for a non-aqueous electrolytic battery of claim 1, wherein adhesion of the film is performed by using a hot-melt adhesive in the form of tape containing a structure capable of reacting with or absorbing an element which diffuses from battery interior.

3. The package for a non-aqueous electrolytic battery of claim 2, wherein adhesion of the film is performed by using a hot-melt adhesive in the form of tape containing, in parallel to the longitudinal direction, a filament structure capable of reacting with or absorbing an element which diffuses from battery interior.

4. A battery using the package for a non-aqueous electrolytic battery of claim 1.

5. A battery using the package for a non-aqueous electrolytic battery of claim 2.

6. A battery using the package for a non-aqueous electrolytic battery of claim 3.

* * * * *